(12) United States Patent
Walter et al.

(10) Patent No.: US 9,093,210 B2
(45) Date of Patent: Jul. 28, 2015

(54) SOLENOID ARMATURE

(75) Inventors: Rainer Walter, Pleidelsheim (DE);
Dieter Maier, Rettenberg (DE);
Johannes Schmid, Immenstadt (DE);
Axel Heinstein, Wimsheim (DE); Ralph Engelberg, Ditzingen (DE); Andreas Burghardt, Stuttgart (DE); Jochen Rager, Bisingen (DE); Matthias Schumacher, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 198 days.

(21) Appl. No.: 13/570,046

(22) Filed: Aug. 8, 2012

(65) Prior Publication Data
US 2013/0037633 A1 Feb. 14, 2013

(30) Foreign Application Priority Data

Aug. 9, 2011 (DE) .......................... 10 2011 080 687
Dec. 9, 2011 (DE) .......................... 10 2011 088 132

(51) Int. Cl.
| H01F 7/08 | (2006.01) |
| F16K 31/06 | (2006.01) |
| H01F 7/16 | (2006.01) |

(52) U.S. Cl.
CPC ............ *H01F 7/081* (2013.01); *F16K 31/0655* (2013.01); *H01F 2007/086* (2013.01); *H01F 2007/1676* (2013.01)

(58) Field of Classification Search
CPC ... F16K 25/005; F16K 31/0655; H01F 7/081; H01F 2007/086; H01F 2007/1676
USPC .............. 251/129.15, 368; 335/279, 281, 298
See application file for complete search history.

(56) References Cited

U.S. PATENT DOCUMENTS

| 4,951,878 | A  | * | 8/1990 | Casey et al. .................... 239/462 |
| 5,482,671 | A  | * | 1/1996 | Weber ............................. 419/36 |
| 6,837,228 | B2 | * | 1/2005 | Baasch et al. ................. 123/585 |
| 6,994,234 | B2 | * | 2/2006 | de Leeuw ...................... 222/504 |
| 7,458,529 | B2 | * | 12/2008 | Ricco et al. ................ 239/585.3 |
| 2003/0062660 | A1 | * | 4/2003 | Beard et al. .................... 264/645 |
| 2010/0047557 | A1 | * | 2/2010 | Baumann et al. ............. 428/325 |
| 2012/0305816 | A1 | * | 12/2012 | Pohlmann et al. ....... 251/129.01 |
| 2013/0207756 | A1 | * | 8/2013 | Maier ............................ 335/261 |

* cited by examiner

*Primary Examiner* — Matthew W Jellett
(74) *Attorney, Agent, or Firm* — Kenyon & Kenyon LLP

(57) ABSTRACT

A solenoid armature for a solenoid actuator, including at least one magnetic region and at least one non-magnetic region, the solenoid armature being configured as a one-piece component having a first and second armature end face, the magnetic and non-magnetic regions being integrally bonded to each other by a two-component powder injection molding technique, and the magnetic region and the non-magnetic region extending in the axial direction at least as far as the first armature end face.

16 Claims, 5 Drawing Sheets

SOLENOID ARMATURE

RELATED APPLICATION INFORMATION

The present application claims priority to and the benefit of German patent application no. 10 2011 080 687.3, which was filed in Germany on Aug. 9, 2011, and German patent application no. 10 2011 088 132.8, which was filed in Germany on Dec. 9, 2011, the disclosures of which are incorporated herein by reference.

FIELD OF THE INVENTION

The present invention relates to a solenoid armature for a solenoid actuator that may be used, for example, in a solenoid valve.

BACKGROUND INFORMATION

Fuel injection valves of the related art, as used, for example, in injection systems for gasoline engines, are constructed as solenoid switching valves, for example, having a coil and a solenoid armature which is formed from a ferritic, magnetic material and which is provided with a hard non-magnetic surface layer, for example of chromium. Thus, due to its design, as the magnetic field builds and collapses, eddy-current losses occur during operation, consequently resulting in impairment of the switching time or, in other words, the dynamics of the fuel injection valve. In addition, fabrication of the solenoid armature is complex and very cost-intensive. Furthermore, resistance to aggressive media such as, for example, ethanol or urea, which are increasingly being included in fuels, is not sufficient to ensure a satisfactory service life of the injection valves also in countries where there is great variation in fuel quality. It is further necessary to ensure compliance with statutory provisions in future, particularly with regard to the use of materials that are hazardous to health.

SUMMARY OF THE INVENTION

The solenoid armature according to the exemplary embodiments and/or exemplary methods of the present invention with the features described herein has, by comparison, the advantage that it has a magnetic circuit of increased efficiency in which eddy currents are minimized and which makes it possible to obtain higher dynamics with short switching times, for example of a valve. In addition, by virtue of the use of suitable materials, improved robustness and wear-resistance toward aggressive media such as ethanol etc. is achieved. In accordance with the exemplary embodiments and/or exemplary methods of the present invention, this is achieved by virtue of the fact that the solenoid armature includes at least one magnetic region and at least one non-magnetic region. The solenoid armature is configured in this case as a one-piece component having a first and second armature end face, and the magnetic and non-magnetic regions are integrally bonded to each other by a two-component powder injection molding technique. In addition, the magnetic region and the non-magnetic region extend in the axial direction at least as far as the first armature end face. That enables fabrication of the one-piece solenoid armature as a two-component powder injection-molded component in a simple manner in a single process step as a mass-produced article with optimization of time and costs. The two-component powder injection molding technique includes in this case a ceramic injection molding (CIM) step and/or a metal powder injection molding (MIM) step.

The further descriptions provide further exemplary embodiments of the present invention.

For as great as possible a reduction of the eddy currents, the non-magnetic region may be configured to be electrically non-conductive. For the non-magnetic region in this case, a corrosion-resistant, inexpensive material may be selected without any particular requirements being placed on magnetic conductivity, such as, for example, FeCr or a ceramic material, which reduces the overall costs of the solenoid armature.

The at least one non-magnetic region may form a stop on the first and/or second armature end face. In that manner, a compact structural shape of the one-piece solenoid armature is obtained, which contributes to a minimized installed size of the fuel injection valve as a whole. Furthermore, by virtue of the use of hard non-magnetic materials, such as, for example, hard metals or ceramics (which may be $ZrO_2$), a high wear-resistance for a valve needle stop is obtained. In addition, magnetic and hydraulic sticking of the valve needle to the end face of the armature when the valve is operating is thereby prevented.

It furthermore may be that at least one non-magnetic region may be configured as a cylindrical region or as a region that tapers in the axial direction. This enables a non-magnetic and hence cheaper material to be used particularly in regions not having a magnetic function.

A plurality of non-magnetic regions may be of an electrically non-conductive and segment-like configuration. This creates isolation layers for the eddy currents, which minimize the eddy-current losses in the armature. The plurality of non-magnetic regions may also be disposed at equidistant intervals in the circumferential direction.

The magnetic region and the non-magnetic region may also be disposed in mutually adjacent relationship in the radial direction. This affords a solenoid armature provided at its outermost side with a magnetic region and at its innermost side with a non-magnetic region which consists of a less expensive material in comparison with the magnetic region and which makes wear-resistant guiding of the armature on the valve needle possible.

A non-magnetic region may also protrude at the first and/or second armature end face. This may also provide for producing sufficiently large stop surfaces with the smallest possible thickness and the smallest possible projecting height from an inexpensive material having a high resistance to wear. Accordingly, an inexpensive alternative to conventional coating methods, such as, for example, hard chromium plating, is provided. The risk of a valve component sticking to the magnetic region is thereby also avoided.

In accordance with a further embodiment, the solenoid armature is configured to have a central through-hole. This ensures operationally reliable guiding of a valve needle disposed therein.

By virtue of the PIM (powder injection molding) technique, bores in the solenoid armature may, in addition, be made more variable in order to minimize hydraulic throttling, and, in particular, may be made larger in the non-magnetic region which is not relevant for the magnetic flux. Armature material that is not required for the magnetic flux may therefore be strategically removed or omitted. Owing to the minimization of the moving masses, this makes a considerable contribution to improving the switching times and, for example, to optimizing the injection behavior of a fuel injection valve.

The non-magnetic regions may be formed from wear-resistant material and extend in the radial direction over the entire axial length of the solenoid armature. The wear-resistant material may also have a high resistance to fuels and to any additives in the fuel, such as, for example, methanol, urea, etc. Also, the magnetic regions may be formed from a magnetic material having a high saturation induction and if the non-magnetic regions are formed from a ceramic material or a hard metal. This allows magnetic material which is expensive and difficult to machine, for example FeCo or FeCrCo, to be used specifically in those regions of relevant magnetic field lines of the solenoid armature that make a significant contribution to the magnetic force of the solenoid armature.

Moreover, by using a magnetic material such as, for example, FeCrCo having a Cr content of at least 13%, or alternatively FeCo having a Co content of at least 35%, it is possible to obtain increased robustness toward gasoline fuel, corrosion and cavitation. The cheaper, second material component is used for the non-magnetic region outside of the relevant magnetic field lines, thereby minimizing the overall costs of the solenoid armature. The second material component may also assume the function of the non-magnetic, hard stop. This further results in a marked saving in weight and an associated improvement in valve function. The magnetic region and the non-magnetic region may be disposed in mutually adjacent relationship in the radial direction.

Exemplary embodiments of the present invention will be described in detail below with reference to the accompanying drawings.

DETAILED DESCRIPTION

Figure 1:
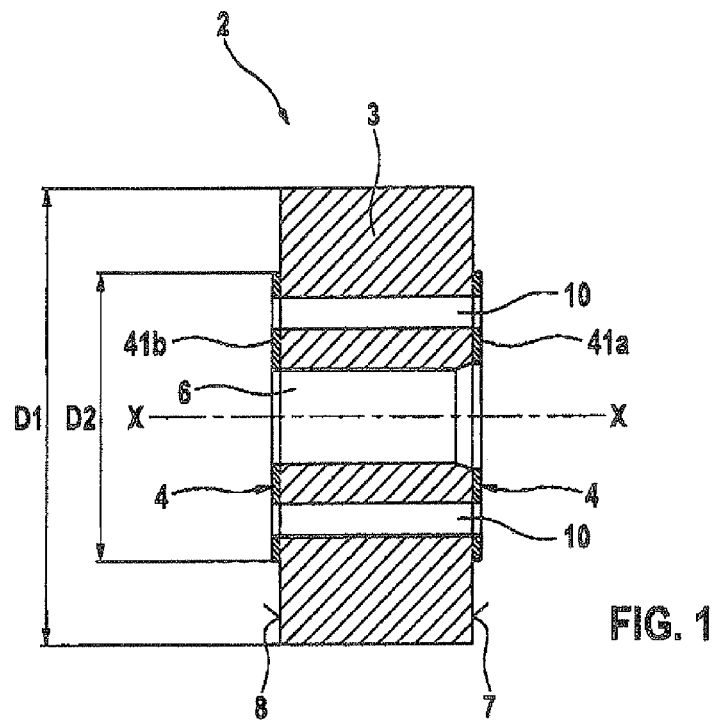
FIG. 1 shows an enlarged schematic sectional view of a solenoid armature in accordance with a first exemplary embodiment of the invention.

Exemplary embodiments of a solenoid armature 2 will be described in detail below with reference to FIGS. 1 through 8. In the exemplary embodiments, identical components or components that are identical in terms of their function are denoted by the same reference numerals.

As may be seen from FIG. 1, the one-piece configuration solenoid armature 2 of a first exemplary embodiment includes a cylindrical magnetic region 3 extending along a central axis X-X, and two non-magnetic regions 4. Non-magnetic regions 4 are each in the form of a thin circular layer 41a, 41b disposed on a first and second armature end face 7, 8 of solenoid armature 2 and are bonded integrally, which may be in the form of a ceramic layer or hard metal layer, to magnetic region 3 by a two-component powder injection molding technique. Magnetic region 3 may be formed from a magnetic material having a high saturation induction at low electrical conductivity, such as, for example, FeCo.

As may further be seen from FIG. 1, the one-piece solenoid armature 2 also has a through-hole 6 in which a valve needle, not visible here, is guided. Also provided are four bores 10 arranged concentrically with respect to through-hole 6, only two of which are visible in FIG. 1. Each layer 41a, 41b of non-magnetic regions 4 has a diameter D2 which is smaller than a diameter D1 of first or second armature end face 7, 8 and which radially does not cover only through-hole 6 and bores 10. There is accordingly provided a solenoid armature 2 that may be fabricated in one piece and inexpensively as a two-component powder injection-molded component with reduced eddy-current losses and with an increased magnetic efficiency, in which hard layers 41a, 41b serve as robust and wear-resistant armature stops.

Figure 2:
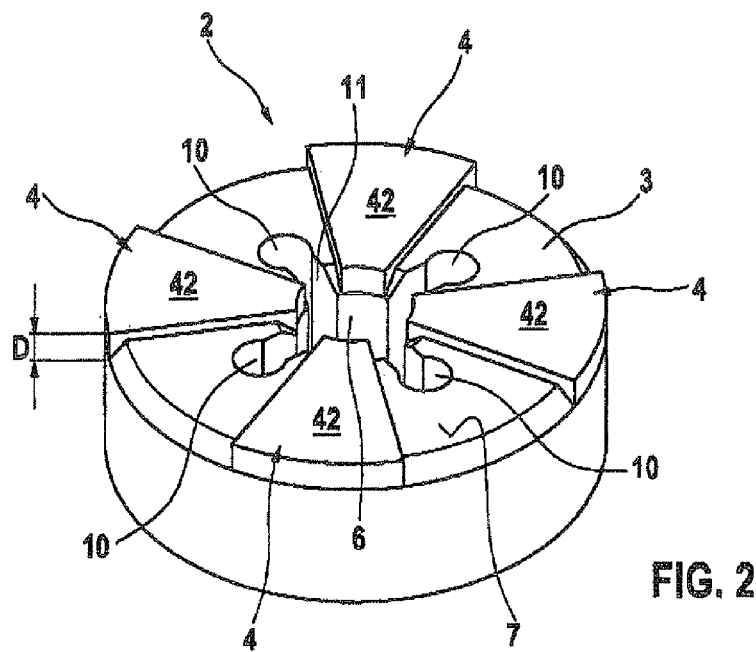
FIG. 2 shows an enlarged perspective illustration of the solenoid armature in accordance with a second exemplary embodiment of the invention.

In contrast to the first exemplary embodiment described above, solenoid armature 2 of the second exemplary embodiment of FIG. 2 has four non-magnetic regions 4 on its first armature end face 7, which are configured as partial surface elements 42 and which are disposed at equidistant intervals in the circumferential direction, in an angular region between bores 10. Partial surface elements 42 are integrally bonded to magnetic region 3 by the two-component powder injection molding technique in the same way as in the case of the first exemplary embodiment. As may further be seen from FIG. 2, a thickness D of partial surface elements 42 is such that they protrude from first armature end face 7. In that manner, an armature stop on first armature end face 7 is made possible without contact with magnetic region 3. In addition, through-hole 6 is connected to each of bores 10 by a respective radially extending opening 11. Owing to the removal of material in openings 11, a reduction in the mass of the solenoid armature and better hydraulic flow are achieved, which results in improved valve performance.

Figure 3:
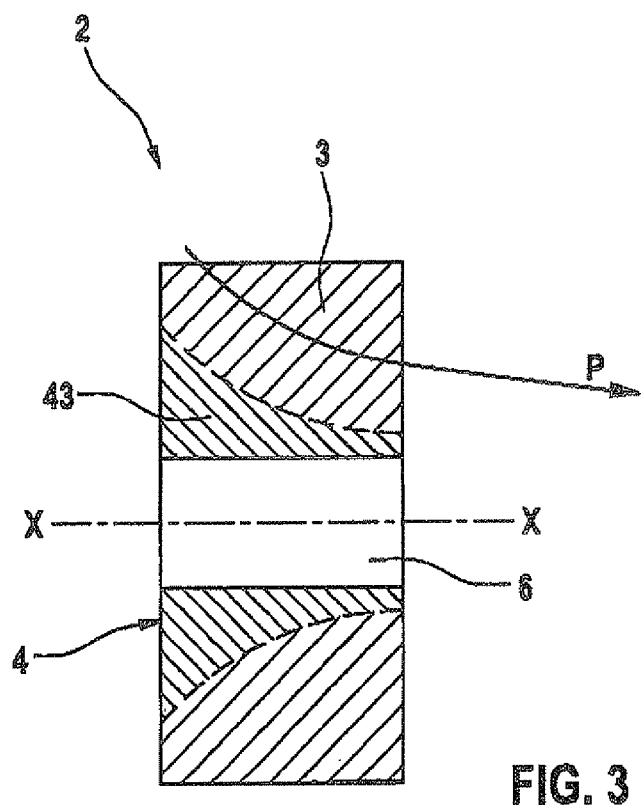
FIG. 3 shows an enlarged schematic sectional view of the solenoid armature in accordance with a third exemplary embodiment of the invention.

In contrast to the first and second exemplary embodiments described above, non-magnetic region 4 of the third exemplary embodiment illustrated in FIG. 3 is configured as an inner element 43 tapering in a funnel shape along central axis X-X and having a cylindrical through-hole 6. It is thereby possible to produce large parts of solenoid armature 2 from an inexpensive and light-weight non-magnetic material without adversely affecting the course of the effective magnetic field lines in magnetic region 3, one of which field lines is shown by way of example marked by an arrow P. A further minimization of magnetic region 3, and hence of the weight and overall costs of solenoid armature 2, is thereby achieved. In addition, the function of the non-magnetic hard armature stops may ideally also be assumed by inner element 43.

Figure 4:
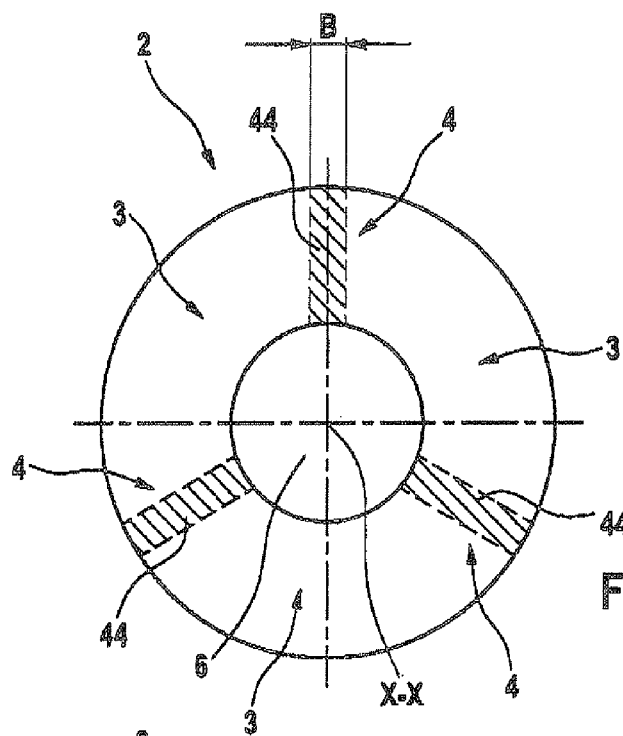
FIG. 4 shows an enlarged front view of the solenoid armature in accordance with a fourth exemplary embodiment of the invention.
Figure 5:
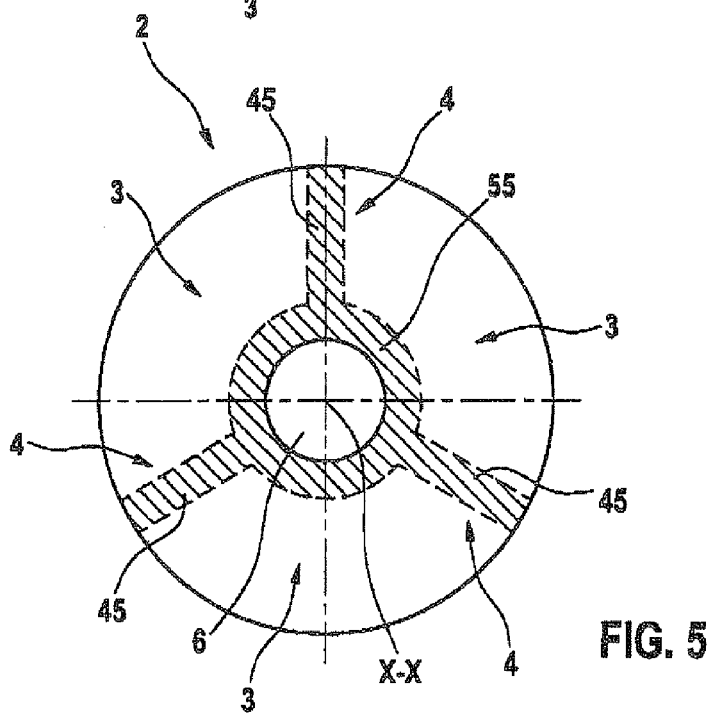
FIG. 5 shows an enlarged front view of the solenoid armature in accordance with a fifth exemplary embodiment of the invention.

As may be seen from the illustration in FIG. 4, non-magnetic region 4 of solenoid armature 2 of the fourth exemplary embodiment is formed by three segments 44 which are disposed at equal angular intervals of 120° and extend radially with respect to central axis X-X and which extend in the radial direction starting at the outer circumference of through-hole 6, and over the entire axial length of solenoid armature 2. In that manner, magnetic regions 3 are also electrically isolated from one another by electrically non-conductive, non-magnetic regions 4. Non-magnetic regions 4 are similarly integrally bonded to magnetic regions 3 of solenoid armature 2 by the two-component powder injection molding technique. A width B of segments 44 is in this case selected to be of such a size, and, more especially, to be from 10 to 100 μm, that electrical isolation of adjacent regions 3 is achieved, thereby resulting in a reduction in eddy-current losses.

In contrast to the fourth exemplary embodiment illustrated in FIG. 4, non-magnetic region 4 of the fifth exemplary embodiment is also formed by three segments 45 disposed at an angular spacing of 120°. In this case, segments 45 are, in addition, connected to one another by a jacket region 55 extending axially around central through-hole 6. In that manner, jacket region 55 of non-magnetic region 4, which jacket region 55 is made, for example, of ceramic material, is able to act as a wear-resistant layer for guiding the valve needle in solenoid armature 2. This also provides a particularly long service life and great robustness toward wear, which also permits use under difficult conditions without any problem. One-piece solenoid armature 2 may nevertheless be fabricated in a very simple and inexpensive manner as a two-component powder injection-molded component.

Figure 6:
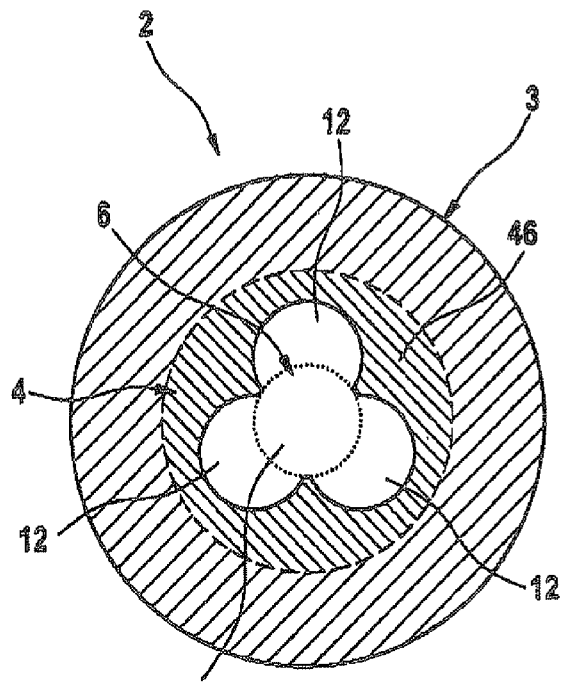
FIG. 6 shows an enlarged schematic sectional view of the solenoid armature in accordance with a sixth exemplary embodiment of the invention.

Non-magnetic region 4 of the sixth exemplary embodiment illustrated in FIG. 6 is constructed in the form of a cylindrical inner element 46 which is integrally bonded to magnetic region 3 by the two-component powder injection molding technique. Inner element 46 has in this case through-hole 6 for receiving a valve needle 9 depicted as a dotted line here. Through-hole 6 is in this case widened by openings 12 formed by removal of material at angular intervals of 120°. When valve needle 9 has been received, as will be seen from FIG. 6 three sickle-shaped residual cross-sections of openings 12 extending over the entire axial length remain in inner element 46.

Figure 7:
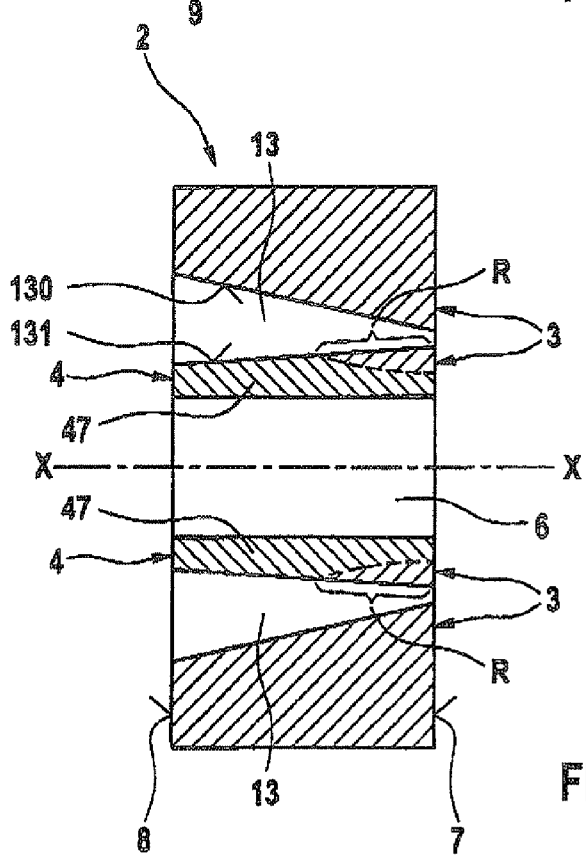
FIG. 7 shows an enlarged schematic sectional view of the solenoid armature in accordance with a seventh exemplary embodiment of the invention.

In the case of the seventh exemplary embodiment illustrated in FIG. 7, non-magnetic region 4 is formed by a substantially cylindrical inner element 47 having through-hole 6, which inner element 47 is radially surrounded by non-magnetic region 3.

As may further be seen from FIG. 7, in this case four apertures 13 which taper conically in the direction of central axis X-X starting at second armature end face 8 are additionally formed in magnetic region 3, only two of which apertures 13 are visible here. Radially outward inside wall regions 130 of apertures 13 extend in this case entirely in magnetic region 3, whereas radially inward inside wall regions 131 of apertures 13 extend initially in inner element 47, starting at second armature end face 8. Owing to a reduction of the material of inner element 47 in the direction toward first armature end face 7, however, inward inside wall regions 131 no longer extend, in a portion R, along inner element 47 but extend along magnetic region 3. Alternatively, instead of four apertures 13, two, three or more than four apertures 13 may be provided.

Figure 8:
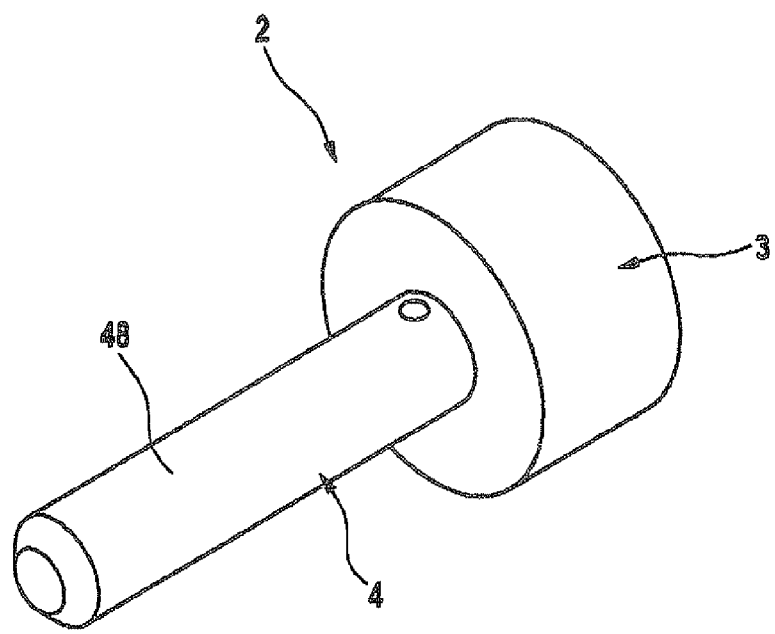
FIG. 8 shows an enlarged perspective view of the solenoid armature in accordance with an eighth exemplary embodiment of the invention.

In the case of the eighth exemplary embodiment shown in FIG. 8, non-magnetic region 4 is formed by an electrically non-conductive, non-magnetic and light-weight guide element 48 in the form of a shaft. Guide element 48 is disposed in through-hole 6 of solenoid armature 2 and is integrally bonded to magnetic region 3 by the two-component powder injection molding technique, thereby enabling solenoid armature 2 to be guided directly in an inner pole of the injection valve. As a result, solenoid armature 2 may be less finely toleranced and the costs thereof are further optimized.

As shown in all the exemplary embodiments, one-piece solenoid armatures 2 may thus be fabricated, even with complex contours, especially economically in a single production process as two-component powder injection-molded components for the solenoid armatures 2 according to the present invention, which cannot be achieved with conventional production methods. In addition to distinctly improved cost efficiency, commensurate with the achievable reduction in mass and the reduced eddy-current losses the dynamic behavior, in particular, of solenoid valves is thereby markedly improved, which in the case of use as fuel injection valves, for example, contributes to considerably reduced fuel consumption and engine emissions. The type variants illustrated in the exemplary embodiments described above may also be combined in any desired combination.

What is claimed is:

1. A solenoid armature for a solenoid actuator, comprising:
a solenoid armature arrangement including at least one magnetic region and at least one non-magnetic region;
wherein the solenoid armature is configured as a one-piece component having a first armature end face and a second armature end face,
wherein the solenoid armature is configured to have a central through-hole that extends over the entire axial length of the solenoid armature,
wherein the magnetic region and the non-magnetic region are integrally bonded to each other by a two-component powder injection molding technique, and
wherein the magnetic region and the non-magnetic region extend in the axial direction at least as far as the first armature end face.

2. The solenoid armature of claim 1, wherein the non-magnetic region is electrically non-conductive.

3. The solenoid armature of claim 1, wherein the at least one non-magnetic region forms a stop on at least one of the first armature end face and the second armature end face.

4. The solenoid armature of claim 1, wherein at least one non-magnetic region is configured as a cylindrical region or as a region that tapers in the axial direction.

5. The solenoid armature of claim 2, wherein a plurality of non-magnetic regions are of an electrically non-conductive and segment-like configuration.

6. The solenoid armature of claim 5, wherein the plurality of non-magnetic regions are disposed at equidistant intervals in a circumferential direction.

7. The solenoid armature of claim 1, wherein the magnetic region and the non-magnetic region are disposed in mutually adjacent relationship in the radial direction.

8. The solenoid armature of claim 1, wherein at least one non-magnetic region protrudes at the first and/or second armature end face.

9. The solenoid armature of claim 1, wherein a jacket region of the central through-hole is formed entirely by a wear-resistant material.

10. The solenoid armature of claim 1, wherein the nonmagnetic regions are formed from electrically nonconductive material and extend in the radial direction over the entire axial length of the solenoid armature.

11. The solenoid armature of claim 1, wherein magnetic regions are formed from a magnetic material having a high saturation induction, and non-magnetic regions are formed from a ceramic material or a hard metal.

12. A solenoid valve, comprising:
a solenoid armature for a solenoid actuator, including:
a solenoid armature arrangement including at least one magnetic region and at least one non-magnetic region;
wherein the solenoid armature is configured as a one-piece component having a first armature end face and a second armature end face, wherein the solenoid armature is configured to have a central through-hole that extends over the entire axial length of the solenoid armature, wherein the magnetic region and the non-magnetic region are integrally bonded to each other by a two-component powder injection molding technique, and wherein the magnetic region and the non-magnetic region extend in the axial direction at least as far as the first armature end face.

13. The solenoid valve of claim 12, wherein the solenoid valve includes an injection valve.

14. The solenoid armature of claim 1, wherein the solenoid actuator includes a solenoid valve.

15. The solenoid armature of claim 1, wherein the central through-hole is cylindrical.

16. A solenoid armature for a solenoid actuator, comprising:

a solenoid armature arrangement including at least one magnetic region and at least one non-magnetic region;

wherein the solenoid armature is configured as a one-piece component having a first armature end face and a second armature end face, wherein the solenoid armature is configured to have a central through-hole, wherein the magnetic region and the non-magnetic region are integrally bonded to each other by a two-component powder injection molding technique, wherein the magnetic region and the non-magnetic region extend in the axial direction at least as far as the first armature end face, wherein the non-magnetic region is electrically non-conductive, and wherein a plurality of non-magnetic regions are of an electrically non-conductive and segment-like configuration.

* * * * *